United States Patent
Zhang

(10) Patent No.: US 12,272,115 B2
(45) Date of Patent: Apr. 8, 2025

(54) VIDEO PROCESSING METHOD, ELECTRONIC DEVICE, AND STORAGE MEDIUM

(71) Applicant: BEIJING BAIDU NETCOM SCIENCE TECHNOLOGY CO., LTD., Beijing (CN)

(72) Inventor: Hui Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 368 days.

(21) Appl. No.: 17/943,018

(22) Filed: Sep. 12, 2022

(65) Prior Publication Data

US 2023/0298303 A1 Sep. 21, 2023

(30) Foreign Application Priority Data

Mar. 21, 2022 (CN) .......................... 202210282230.6

(51) Int. Cl.
*G06T 5/92* (2024.01)
*G06T 5/90* (2024.01)
(Continued)

(52) U.S. Cl.
CPC .............. *G06V 10/60* (2022.01); *G06T 5/90* (2024.01); *G09G 3/22* (2013.01); *G06T 2207/20208* (2013.01); *G09G 2320/0626* (2013.01)

(58) Field of Classification Search
CPC . G06V 10/60; G06T 5/90; G06T 2207/20208; G06T 5/92;
(Continued)

(56) References Cited

U.S. PATENT DOCUMENTS 10,062,333 B2 * 8/2018 Farrell ...................... G09G 3/34
11,182,882 B2 * 11/2021 Leleannec ................. G06T 5/92
2017/0353704 A1 12/2017 Su et al.

FOREIGN PATENT DOCUMENTS

CN 106030503 A 10/2016
CN 106134172 A 11/2016
(Continued)

OTHER PUBLICATIONS

Notice of Allowance for Chinese Application No. 2022102822306, dated Dec. 6, 2023, 5 Pages.
(Continued)

*Primary Examiner* — Bobbak Safaipour
*Assistant Examiner* — Dylan J Sherrillo
(74) *Attorney, Agent, or Firm* — Brooks Kushman P.C.

(57) ABSTRACT

There is provided a method for video processing, an electronic device, and a storage medium, which relates to the technical field of image processing, specifically to technical fields such as digital video and image display, which may be used in intelligent cloud and cloud computing scenarios. A specific implementation solution involves: acquiring ambient brightness data of a display device, the display device adopting a standard dynamic range (SDR) technology; obtaining screen brightness data of the display device according to video brightness data of to-be-displayed high dynamic range (HDR) video, metadata of the HDR video, and the ambient brightness data; wherein the video brightness data is obtained by tone mapping according to the metadata; and controlling, by using the screen brightness data, the display device to display the HDR video.

11 Claims, 4 Drawing Sheets

(51) Int. Cl.
*G06V 10/60* (2022.01)
*G09G 3/22* (2006.01)

(58) Field of Classification Search
CPC ............ G06T 2207/10024; G09G 3/22; G09G 2320/0626; H04N 21/4854; H04N 23/70; H04N 23/76
See application file for complete search history.

(56) References Cited

FOREIGN PATENT DOCUMENTS

| | | | | | |
|---|---|---|---|---|---|
| CN | 106165403 | A | | 11/2016 | |
| CN | 107690811 | A | | 2/2018 | |
| CN | 107864349 | A | | 3/2018 | |
| CN | 108352059 | A | * | 7/2018 | ............. G06T 5/009 |
| CN | 109036296 | A | | 12/2018 | |
| CN | 109661806 | A | | 4/2019 | |
| CN | 113889053 | A | | 1/2022 | |
| CN | 114138218 | A | | 3/2022 | |
| JP | 2020039118 | A | | 3/2020 | |
| JP | 2020113907 | A | | 7/2020 | |
| KR | 102059256 | B1 | * | 12/2019 | ......... G06F 3/04847 |

OTHER PUBLICATIONS

Perrin, Anne-Flore, Quality Assessment of an HDR Dual-Layer Backward-Compatible Codec Compared to Uncompromised SDR and HDR Solutions, pp. 1-10, 2018, IEEE Transactions on Broadcasting.
Zi, Wei, Exploration of HDR and SDR On-Site Collaborative Production Technology, Aug. 2019.

* cited by examiner

VIDEO PROCESSING METHOD, ELECTRONIC DEVICE, AND STORAGE MEDIUM

CROSS-REFERENCE TO RELATED APPLICATIONS

The present application claims the priority of Chinese Patent Application No. 202210282230.6, filed on Mar. 21, 2022, with the title of "VIDEO PROCESSING METHOD AND APPARATUS, ELECTRONIC DEVICE, AND STORAGE MEDIUM." The disclosure of the above application is incorporated herein by reference in its entirety.

FIELD OF THE DISCLOSURE

The present disclosure relates to the technical field of image processing, specifically to technical fields such as digital video and image display, which may be used in intelligent cloud and cloud computing scenarios.

BACKGROUND OF THE DISCLOSURE

A high dynamic range (HDR) technology is a set of technologies used to achieve a larger exposure dynamic range than an ordinary digital image technology in computer graphics and cinematography. HDR video is characterized by an HDR.

Currently, if HDR video is to be played back on a display device adopting a standard dynamic range (SDR) technology, the HDR of the HDR video is required to be compressed within a range that can be supported by the SDR display device.

SUMMARY OF THE DISCLOSURE

The present disclosure provides a method for video processing, an electronic device, and a storage medium.

According to one aspect of the present disclosure, a method for video processing is provided, including acquiring ambient brightness data of a display device, the display device adopting an SDR technology; obtaining screen brightness data of the display device according to video brightness data of to-be-displayed HDR video, metadata of the HDR video, and the ambient brightness data; wherein the video brightness data is obtained by tone mapping according to the metadata; and controlling, by using the screen brightness data, the display device to display the HDR video.

According to another aspect of the present disclosure, an electronic device is provided, including at least one processor; and a memory communicatively connected with the at least one processor; wherein the memory stores instructions executable by the at least one processor, and the instructions are executed by the at least one processor to enable the at least one processor to perform a method for video processing, wherein the method includes acquiring ambient brightness data of a display device, the display device adopting an SDR technology; obtaining screen brightness data of the display device according to video brightness data of to-be-displayed HDR video, metadata of the HDR video, and the ambient brightness data; wherein the video brightness data is obtained by tone mapping according to the metadata; and controlling, by using the screen brightness data, the display device to display the HDR video.

According to yet another aspect of the present disclosure, there is provided a non-transitory computer readable storage medium with computer instructions stored thereon, wherein the computer instructions are used for causing a method for video processing, wherein the method includes acquiring ambient brightness data of a display device, the display device adopting a standard dynamic range (SDR) technology; obtaining screen brightness data of the display device according to video brightness data of to-be-displayed high dynamic range (HDR) video, metadata of the HDR video, and the ambient brightness data; wherein the video brightness data is obtained by tone mapping according to the metadata; and controlling, by using the screen brightness data, the display device to display the HDR video.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The accompanying drawings are intended to provide a better understanding of the solutions and do not constitute a limitation on the present disclosure. In the drawings.

DETAILED DESCRIPTION OF PREFERRED EMBODIMENTS

Figure 1:
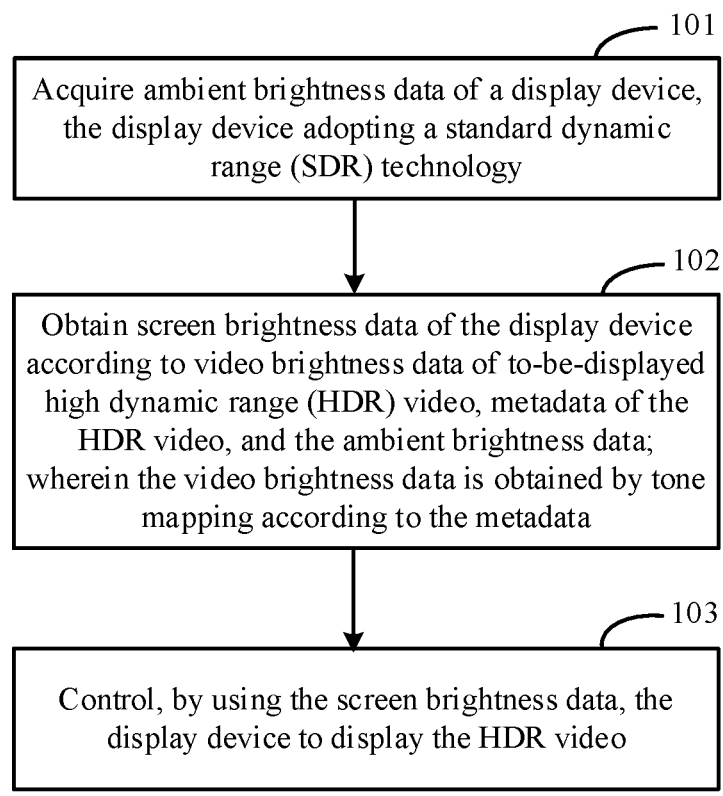
FIG. 1 is a schematic diagram according to a first embodiment of the present disclosure.

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

Obviously, the embodiments described are some of rather than all of the embodiments of the present disclosure. All other embodiments acquired by those of ordinary skill in the art without creative efforts based on the embodiments of the present disclosure fall within the protection scope of the present disclosure.

It is to be noted that the terminal device involved in the embodiments of the present disclosure may include, but is not limited to, smart devices such as mobile phones, personal digital assistants (PDAs), wireless handheld devices, and tablet computers. The display device may include, but is not limited to, devices with a display function such as personal computers and televisions.

In addition, the term "and/or" herein is merely an association relationship describing associated objects, indicating that three relationships may exist. For example, A and/or B indicates that there are three cases of A alone, A and B together, and B alone. Besides, the character "/" herein generally means that associated objects before and after it are in an "or" relationship.

An HDR technology is a set of technologies used to achieve a larger exposure dynamic range (i.e., a greater light and shade difference) than an ordinary digital image technology in computer graphics and cinematography. A dynamic range refers to the number of grayscale levels between brightest and darkest points in an image. The greater the dynamic range, the greater the range of brightness and contrast in the image. The HDR technology is intended to correctly represent brightness across a wide range from direct sunlight to the darkest shadows in the real world.

HDR video is characterized by an HDR. The HDR video can expand a brightness range of display, show more bright and dark details, and bring richer colors and more vivid and natural details to pictures, so that TV pictures are closer to what human eyes see.

An SDR is a very common color display manner, which has a smaller information size than the HDR and enjoys high popularity. Generally, a conventional display device adopts an SDR display technology. If HDR video is to be played on an SDR display device, an HDR of the HDR video is required to be compressed to a range that can be supported by the SDR display device.

Currently, when the HDR video is displayed by the SDR display device, in the related art, brightness of the SDR display device is adjusted to maximum brightness or a fixed brightness value after tone mapping, so as to restore a viewing effect of the HDR video on an HDR display device as much as possible. However, based on the solution, the HDR video displayed on the SDR display device brings a poor effect.

Therefore, it is urgent to provide a method for video processing to better display the HDR video on the SDR display device, so as to ensure reliability of display of the HDR video.

FIG. 1 is a schematic diagram according to a first embodiment of the present disclosure, as shown in FIG. 1.

In 101, ambient brightness data of a display device is acquired, the display device adopting an SDR technology.

In 102, screen brightness data of the display device is obtained according to video brightness data of to-be-displayed HDR video, metadata of the HDR video, and the ambient brightness data; wherein the video brightness data is obtained by tone mapping according to the metadata.

In 103, the display device is controlled, by using the screen brightness data, to display the HDR video.

It is to be noted that the ambient brightness data of the display device may include light brightness in a current environment where the display device is located. The ambient brightness data may be obtained by a collection device corresponding to the display device. The collection device may include, but is not limited to, a light sensor, and the like.

It is to be noted that the display device may be a device with a display screen. For example, the display device may include, but is not limited to, a mobile communication terminal, a tablet computer, a TV set, and the like.

It is to be noted that 101 to 103 may be partially or wholly performed by an application located in a local terminal, or a functional unit arranged in an application located in a local terminal such as a plug-in or a Software Development Kit (SDK), or a processing engine located in a server on a network side, or a distributed system located on a network side, such as a processing engine or distributed system in a video processing platform on the network side, which is not particularly limited in this embodiment.

It may be understood that the application may be a nativeApp installed on a local terminal, or a webApp of a browser on a local terminal, which is not limited in this embodiment.

In this way, ambient brightness data of a display device adopting an SDR technology can be acquired, and then screen brightness data of the display device can be obtained according to video brightness data of to-be-displayed HDR video, metadata of the HDR video, and the ambient brightness data, so that the screen brightness data can be used to control the display device to display the HDR video. Thus, the video brightness data obtained by tone mapping according to the metadata is adjusted to obtain the screen brightness data used by an SDR display device to display the HDR video, so that the SDR display device can better display the HDR video, that is, bring a better display effect of the HDR video, thereby improving reliability of display of the HDR video.

Optionally, in one possible implementation of this embodiment, in 102, specifically, maximum brightness in the metadata may be obtained according to the metadata of the HDR video, and then the screen brightness data of the display device may be obtained according to the video brightness data, the maximum brightness, and the ambient brightness data.

In the implementation, the metadata of the HDR video may include, but is not limited to, maximum brightness and maximum frame average brightness of the video.

Here, the maximum brightness, i.e., maximum content brightness of the video, may refer to a brightness value corresponding to an image with maximum overall brightness in the video. The maximum frame average brightness may refer to a brightness value corresponding to an image with maximum average brightness in the video.

In a specific implementation process of the implementation, firstly, the HDR video may be acquired. Then, the HDR video is decoded, and decoded video data is obtained. Finally, metadata is extracted from the decoded video data.

In the specific implementation process, the HDR video may be an HDR video source. The HDR video source may include, but is not limited to, a local video file and an online streaming media file.

In this way, in the implementation, the screen brightness data of the display device may be obtained according to the video brightness data, the maximum brightness in the metadata, and the ambient brightness data. Due to the consideration of various influencing factors, the screen brightness data of the obtained display device can bring a better display effect, and further enable the SDR display device to display the HDR video better, thereby further improving the display effect and reliability of the HDR video.

Optionally, in one possible implementation of this embodiment, in 102, specifically, the metadata of the HDR video may be acquired, and then the video brightness data may be obtained by tone mapping on the metadata, so that the video brightness data can be adjusted according to the ambient brightness data and the metadata by using a brightness adjustment function, so as to obtain the screen brightness data of the display device.

In a specific implementation process of the implementation, firstly, the metadata of the HDR video and display data of the display device may be acquired. Then, brightness data after electro-optic conversion may be obtained according to the metadata by using a preset electro-optic conversion function. Next, brightness data after tone mapping may be obtained according to the brightness data after electro-optic conversion and the display data of the display device by using a preset tone mapping function. Moreover, color gamut conversion may be performed on the brightness data after tone mapping to obtain brightness data after color gamut conversion. Finally, the screen brightness data of the display device may be obtained according to the brightness data after color gamut conversion by using a preset photoelectric conversion function.

In the specific implementation process, the preset electro-optic conversion function, the preset tone mapping function, and the preset photoelectric conversion function may be obtained according to a preset HDR standard.

Specifically, the preset HDR standard may include, but is not limited to, a Society of Motion Picture and Television Engineers (SMPTE) ST 2084 standard and an Association of Radio Industries and Businesses (ARIB) STD-B67 standard.

In the specific implementation process, the display data of the display device may include, but is not limited to, maximum screen brightness, a color gamut parameter, and the like.

In the implementation, the brightness adjustment function may be obtained based on an evaluation fitting algorithm.

In another specific implementation process of the implementation, firstly, video brightness sample data and ambient brightness sample data may be acquired. Then, the video brightness sample data is evaluated and adjusted according to the ambient brightness sample data to obtain screen brightness evaluation data. Finally, data fitting is performed on the ambient brightness sample data, the video brightness sample data, and the screen brightness evaluation data to obtain the brightness adjustment function.

In the implementation, the brightness adjustment function may be obtained based on an S-shaped curve function.

Specifically, the S-shaped curve function may be a logistic function.

In a further specific implementation process of the implementation, an expression of the brightness adjustment function F can be shown as Formula (1):

$$F(L_{in}, L_{env}) = \theta \times \frac{L_{in}}{1 + e^{\left(5 - 10 \times \max\left(1, \frac{L_{env}}{L_{max}}\right)\right)}} \quad (1)$$

where $F(L_{in}, L_{env})$ may be the screen brightness data, that is, $L_{out}$; $L_{in}$ may be the video brightness data; $L_{env}$ may be the ambient brightness data; $L_{max}$ may be the maximum brightness in the metadata; and $\theta$ may be a constant.

Specifically, $$\max\left(1, \frac{L_{env}}{L_{max}}\right)$$

may limit an independent variable range of an S curve between 0 and 1; $\theta$ may play a limiting role here, that is, limit a maximum magnification of $L_{out}$ relative to $L_{in}$.

Here, based on the brightness adjustment function, a relationship between $L_{out}$ and $L_{env}$ can conform to a change rule of the S curve when $L_{in}$ remains unchanged. That is, in a dark environment, the lower the $L_{env}$, the lower the $L_{out}$, and a change relationship is relatively gentle. In a bright environment, the higher the $L_{env}$, the higher the $L_{out}$, and a change relationship is relatively gentle. Under conventional ambient brightness, a relationship between $L_{env}$ and $L_{out}$ is approximately linear, and brightness of a video picture can respond quickly to the ambient brightness.

In this way, in this implementation, the video brightness data can be obtained by tone mapping on the metadata of the HDR video, so that the video brightness data can be adjusted according to the ambient brightness data and the metadata by using a brightness adjustment function, so as to obtain the screen brightness data of the display device. Thus, by comprehensively considering various factors that affect the display effect, the brightness adjustment function is used to adjust the video brightness data of the HDR video to obtain the screen brightness data with a better display effect, so that the screen brightness data can be used to display the HDR video subsequently to enable the SDR display device to better display the HDR video, thereby improving a display effect and reliability of the HDR video on the SDR display device.

Moreover, the video brightness data is adjusted according to the ambient brightness data and the metadata by using the brightness adjustment function obtained based on an S-shaped curve function, so as to obtain the screen brightness data for displaying the HDR video, so that screen brightness of the display device that plays back the HDR video is neither too dim in a dark environment nor too bright in a bright environment. At the same time, rapid response to a change in the ambient light brightness under normal brightness can also be realized. Thus, the SDR display device is further enabled to better display the HDR video, so as to further improve the display effect and reliability of the HDR video on the SDR display device.

It is to be noted that the multiple specific implementation processes of obtaining the screen brightness data of the display device provided in this implementation may be combined with the multiple specific implementation processes of obtaining the screen brightness data of the display device provided in the foregoing implementation to realize the method for video processing in this embodiment. Detailed descriptions may be obtained with reference to the relevant content in the foregoing implementation. Details are not described herein.

In this embodiment, ambient brightness data of a display device adopting an SDR technology is acquired, and then screen brightness data of the display device can be obtained according to video brightness data of to-be-displayed HDR video, metadata of the HDR video, and the ambient brightness data, so that the screen brightness data can be used to control the display device to display the HDR video. Thus, the video brightness data obtained by tone mapping according to the metadata is adjusted to obtain the screen brightness data used by an SDR display device to display the HDR video, so that the SDR display device can better display the HDR video, that is, bring a better display effect of the HDR video, thereby improving reliability of display of the HDR video.

In addition, by use of the technical solution according to this embodiment, the screen brightness data of the display device may be obtained according to the video brightness data, the maximum brightness in the metadata, and the ambient brightness data. Due to the consideration of various influencing factors, the screen brightness data of the obtained display device can bring a better display effect, and further enable the SDR display device to display the HDR video better, thereby further improving the display effect and reliability of the HDR video.

In addition, by use of the technical solution according to this embodiment, the video brightness data may be obtained by tone mapping on the metadata of the HDR video acquired, so that the video brightness data can be adjusted according to the ambient brightness data and the metadata by using a brightness adjustment function, so as to obtain the screen brightness data of the display device. Thus, by comprehensively considering various factors that affect the display effect, the brightness adjustment function is used to adjust the video brightness data of the HDR video to obtain the screen brightness data with a better display effect, so that the screen brightness data can be used to display the HDR video subsequently to enable the SDR display device to better display the HDR video, thereby improving a display effect and reliability of the HDR video on the SDR display device.

In addition, by use of the technical solution according to this embodiment, the video brightness data is adjusted according to the ambient brightness data and the metadata by using the brightness adjustment function obtained based on an S-shaped curve function, so as to obtain the screen brightness data for displaying the HDR video, so that screen brightness of the display device that plays back the HDR video is neither too dim in a dark environment nor too bright in a bright environment. At the same time, rapid response to a change in the ambient light brightness under normal brightness can also be realized. Thus, the SDR display device is further enabled to better display the HDR video, so as to further improve the display effect and reliability of the HDR video on the SDR display device.

Figure 2:
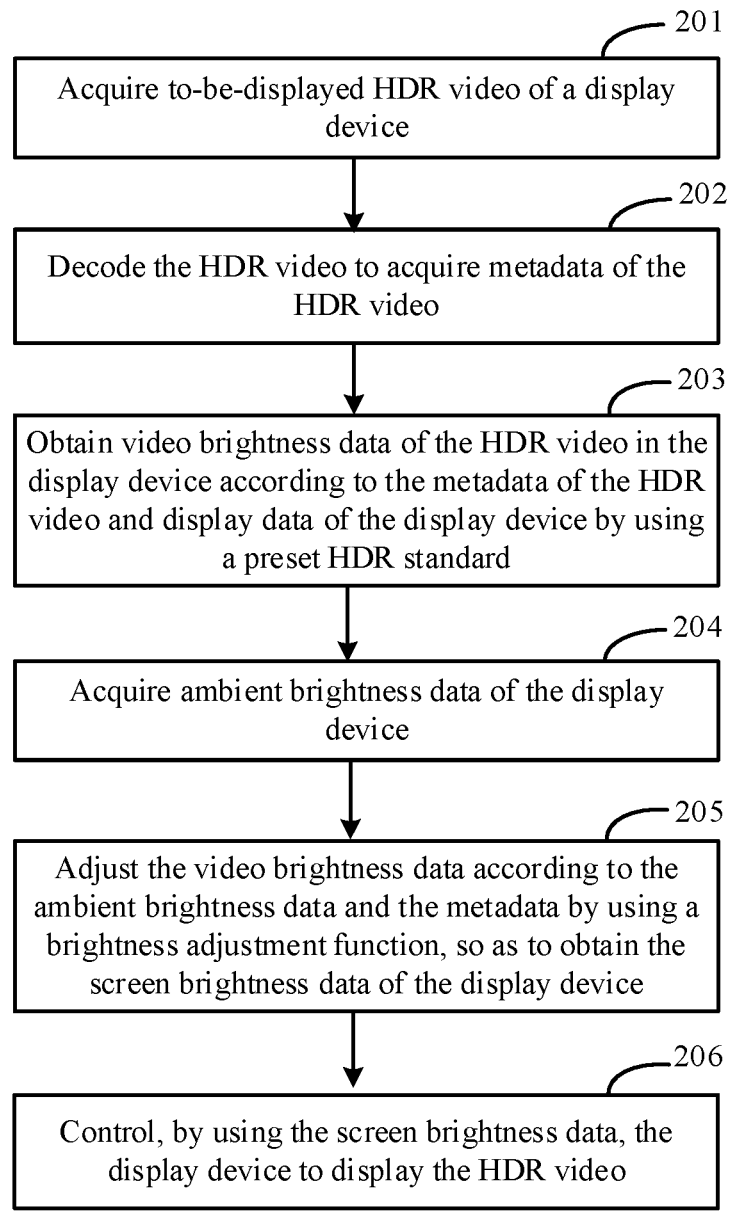
FIG. 2 is a schematic diagram according to a second embodiment of the present disclosure.

FIG. 2 is a schematic diagram according to a second embodiment of the present disclosure, as shown in FIG. 2.

In 201, to-be-displayed HDR video of a display device is acquired.

In 202, the HDR video is decoded to acquire metadata of the HDR video.

In this embodiment, to-be-displayed HDR video in a preset period of time may be acquired. Alternatively, to-be-displayed HDR video of a preset size may be acquired. For example, the acquired HDR video may be one episode for any TV series.

Specifically, the metadata of the HDR video may include, but is not limited to, maximum brightness and maximum frame average brightness of the video.

In 203, video brightness data of the HDR video in the display device is obtained according to the metadata of the HDR video and display data of the display device by using a preset HDR standard.

In this embodiment, a preset electro-optic conversion function, a preset tone mapping function, and a preset photoelectric conversion function may be obtained according to the preset HDR standard.

In a specific implementation process of this embodiment, firstly, the metadata of the HDR video and the display data of the display device may be acquired. Then, brightness data after electro-optic conversion may be obtained according to the metadata by using the preset electro-optic conversion function. Next, brightness data after tone mapping may be obtained according to the brightness data after electro-optic conversion and the display data of the display device by using the preset tone mapping function. Moreover, color gamut conversion may be performed on the brightness data after tone mapping to obtain brightness data after color gamut conversion. Finally, the screen brightness data of the display device may be obtained according to the brightness data after color gamut conversion by using the preset photoelectric conversion function.

In this embodiment, the display data of the display device may include, but is not limited to, maximum screen brightness, a color gamut parameter, and the like.

In this embodiment, the preset electro-optic conversion function may be a PQ curve function. The preset tone mapping function may be a cubic spline curve function. The preset photoelectric conversion function may be a gamma curve function.

Specifically, the color gamut conversion may be color space conversion. For example, the brightness data may be divided to RGB components, and the brightness data after color gamut conversion may be obtained by matrix calculation by using a color gamut conversion standard.

In 204, ambient brightness data of the display device is acquired.

In this embodiment, the ambient brightness data of the display device may include light brightness in a current environment where the display device is located, that is, ambient light brightness.

The ambient brightness data may be obtained by a collection device corresponding to the display device. The collection device may include, but is not limited to, a light sensor, and the like.

It may be understood that the display device may be a device with a display screen. For example, the display device may include, but is not limited to, a mobile communication terminal, a tablet computer, a smart TV set, and the like.

In 205, the video brightness data is adjusted according to the ambient brightness data and the metadata by using a brightness adjustment function, so as to obtain the screen brightness data of the display device.

In this embodiment, the brightness adjustment function may be obtained based on an evaluation fitting algorithm.

For example, the brightness adjustment function may be obtained by subjective evaluation experiment fitting. HDR video sources with different brightness are acquired, subjective evaluation experiments are carried out in laboratory environments with different ambient light brightness, and playback output brightness of the display device is adjusted until a subject's subjective perception reaches an optimal value, so that data fitting can be performed on HDR video brightness, ambient light brightness, and the optimal playback output brightness of the display device, and the corresponding brightness adjustment function can be obtained.

In addition, in this embodiment, the brightness adjustment function may be obtained based on an S-shaped curve function.

Specifically, the S-shaped curve function may be a logistic function. An expression of the brightness adjustment function F can be shown as Formula (1). Based on the brightness adjustment function, a relationship between $L_{out}$ and $L_{env}$ can conform to a change rule of the S curve when $L_{in}$ remains unchanged. In this way, the display device can display the HDR video at a brightness level that is neither too dark nor too bright, while at the same time responding quickly to a change in the ambient light brightness under normal brightness.

In 206, the display device is controlled, by using the screen brightness data, to display the HDR video.

In this embodiment, according to an environment change of the display device, ambient brightness data after the change can be further acquired, and then the screen brightness data of the display device can be adjusted in real time according to the ambient brightness data after the change, the video brightness data of the HDR video, and the metadata of the HDR video, so that screen brightness data after the adjustment can be used to control the display device to display the HDR video.

Figure 3:
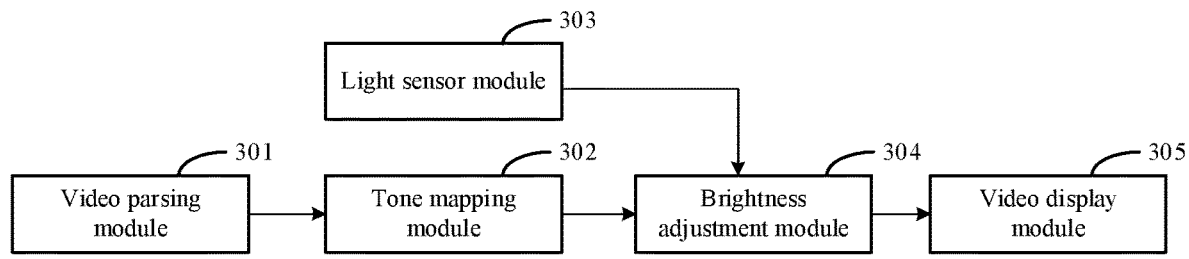
FIG. 3 is a schematic diagram of an application architecture of a method for video processing according to the second embodiment of the present disclosure.

In this embodiment, FIG. 3 is a schematic diagram of an application architecture of a method for video processing according to the second embodiment of the present disclosure.

As shown in FIG. 3, the application architecture of the method for video processing includes a video parsing module 301, a tone mapping module 302, a light sensor module 303, a brightness adjustment module 304, and a video display module 305.

Specifically, the video parsing module 301 may receive or acquire inputted HDR video, decode the HDR video, and extract metadata information of the HDR video.

The tone mapping module 302 may obtain video brightness data of the HDR video in a display device according to metadata of the HDR video and display data of the display device by using a preset HDR standard.

The light sensor module may acquire ambient light brightness of an environment where an SDR display device is currently located, that is, ambient brightness data.

The brightness adjustment module 304 may adjust the video brightness data according to the ambient brightness data and the metadata by using a brightness adjustment function, so as to calculate screen brightness data of the display device.

The video display module 305 may display a video picture of the HDR video on a screen of the display device according to the screen brightness data of the display device.

It may be understood that the method for video processing according to this embodiment may be applied to scenarios that may include, but are not limited to, a variety of video playback applications. The video playback applications may support an SDR technology.

In this embodiment, the video brightness data may be obtained by tone mapping on the metadata of the HDR video acquired, so that the video brightness data can be adjusted according to the ambient brightness data and the metadata by using a brightness adjustment function, so as to obtain the screen brightness data of the display device. Thus, by comprehensively considering various factors that affect the display effect, the brightness adjustment function is used to adjust the video brightness data of the HDR video to obtain the screen brightness data with a better display effect, so that the screen brightness data can be used to display the HDR video subsequently to enable the SDR display device to better display the HDR video, thereby improving a display effect and reliability of the HDR video on the SDR display device.

In addition, by use of the technical solution according to this embodiment, the video brightness data is adjusted according to the ambient brightness data and the metadata by using the brightness adjustment function, so as to obtain the screen brightness data for displaying the HDR video, so that screen brightness of the display device that plays back the HDR video is neither too dim in a dark environment nor too bright in a bright environment. At the same time, rapid response to a change in the ambient light brightness under normal brightness can also be realized. Thus, the SDR display device is further enabled to better display the HDR video, so as to further improve the display effect and reliability of the HDR video on the SDR display device.

In addition, by use of the technical solution according to this embodiment, by improving the experience of watching HDR video on an SDR device, ambient brightness factors are taken into account on the premise of restoring HDR pictures as much as possible, so that users can have a good viewing experience in any environment, which optimizes the users' viewing experience.

It is to be noted that, to make the description brief, the foregoing method embodiments are expressed as a series of combinations of actions. However, those skilled in the art should appreciate that the present disclosure is not limited to the described action sequence, because according to the present disclosure, some steps may be performed in other sequences or performed simultaneously. Further, those skilled in the art should also appreciate that all the embodiments described in the specification are preferred embodiments, and the related actions and modules are not necessarily mandatory to the present disclosure.

In the above embodiments, the descriptions of the embodiments have respective focuses. For a part that is not described in detail in one embodiment, refer to related descriptions in other embodiments.

Figure 4:
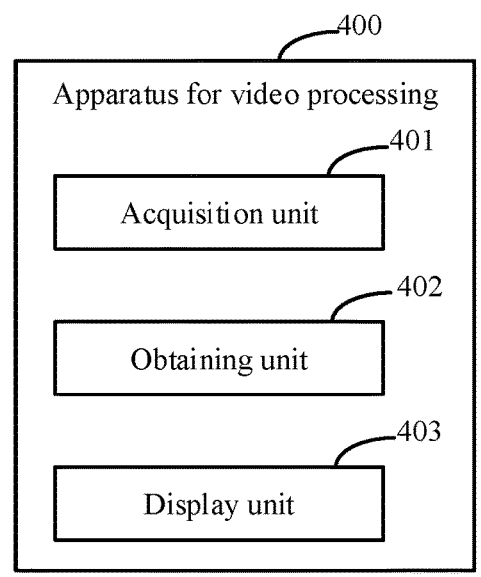
FIG. 4 is a schematic diagram according to a third embodiment of the present disclosure.

FIG. 4 is a schematic diagram according to a third embodiment of the present disclosure, as shown in FIG. 4. An apparatus 400 for video processing according to this embodiment may include an acquisition unit 401, an obtaining unit 402, and a display unit 403. The acquisition unit 401 is configured to acquire ambient brightness data of a display device, the display device adopting an SDR technology. The obtaining unit 402 is configured to obtain screen brightness data of the display device according to video brightness data of to-be-displayed HDR video, metadata of the HDR video, and the ambient brightness data; wherein the video brightness data is obtained by tone mapping according to the metadata. The display unit is configured to control, by using the screen brightness data, the display device to display the HDR video.

It is to be noted that the apparatus for video processing according to this embodiment may be partially or wholly an application located in a local terminal, or a functional unit arranged in an application located in a local terminal such as a plug-in or an SDK, or a processing engine located in a server on a network side, or a distributed system located on a network side, such as a processing engine or distributed system in a video processing platform on the network side, which is not particularly limited in this embodiment.

It may be understood that the application may be a nativeApp installed on a local terminal, or a webApp of a browser on a local terminal, which is not limited in this embodiment.

Optionally, in one possible implementation of this embodiment, the obtaining unit 402 may be specifically configured to: obtain maximum brightness in the metadata according to the metadata of the HDR video, and obtain the screen brightness data of the display device according to the video brightness data, the maximum brightness, and the ambient brightness data.

Optionally, in one possible implementation of this embodiment, the obtaining unit 402 may be further configured to: acquire the metadata of the HDR video, obtain the video brightness data by tone mapping on the metadata, and adjust the video brightness data according to the ambient brightness data and the metadata by using a brightness adjustment function, so as to obtain the screen brightness data of the display device.

Optionally, in one possible implementation of this embodiment, the brightness adjustment function may be obtained based on an evaluation fitting algorithm.

Optionally, in one possible implementation of this embodiment, the brightness adjustment function may be obtained based on an S-shaped curve function.

Optionally, in one possible implementation of this embodiment, the S-shaped curve function may be a logistic function.

In this embodiment, ambient brightness data of a display device may be acquired, the display device adopts an SDR technology, and then the obtaining unit may obtain screen brightness data of the display device according to video brightness data of to-be-displayed HDR video, metadata of the HDR video, and the ambient brightness data, wherein the video brightness data is obtained by tone mapping according to the metadata, so that the display unit can control, by using the screen brightness data, the display device to display the HDR video. The video brightness data obtained by tone mapping according to the metadata is adjusted to obtain the screen brightness data used by an SDR display device to display the HDR video, so that the SDR display device can better display the HDR video, that is, bring a better display effect of the HDR video, thereby improving reliability of display of the HDR video.

In addition, by use of the technical solution according to this embodiment, the screen brightness data of the display device may be obtained according to the video brightness data, the maximum brightness in the metadata, and the ambient brightness data. Due to the consideration of various influencing factors, the screen brightness data of the obtained display device can bring a better display effect, and further enable the SDR display device to display the HDR video better, thereby further improving the display effect and reliability of the HDR video.

In addition, by use of the technical solution according to this embodiment, the video brightness data may be obtained by tone mapping on the metadata of the HDR video acquired, so that the video brightness data can be adjusted according to the ambient brightness data and the metadata by using a brightness adjustment function, so as to obtain the screen brightness data of the display device. Thus, by comprehensively considering various factors that affect the display effect, the brightness adjustment function is used to adjust the video brightness data of the HDR video to obtain the screen brightness data with a better display effect, so that the screen brightness data can be used to display the HDR video subsequently to enable the SDR display device to better display the HDR video, thereby improving a display effect and reliability of the HDR video on the SDR display device.

In addition, by use of the technical solution according to this embodiment, the video brightness data is adjusted according to the ambient brightness data and the metadata by using the brightness adjustment function obtained based on an S-shaped curve function, so as to obtain the screen brightness data for displaying the HDR video, so that screen brightness of the display device that plays back the HDR video is neither too dim in a dark environment nor too bright in a bright environment. At the same time, rapid response to a change in the ambient light brightness under normal brightness can also be realized. Thus, the SDR display device is further enabled to better display the HDR video, so as to further improve the display effect and reliability of the HDR video on the SDR display device.

Collection, storage, use, processing, transmission, provision, and disclosure of users' personal information involved in the technical solutions of the present disclosure comply with relevant laws and regulations, and do not violate public order and moral.

According to embodiments of the present disclosure, the present disclosure further provides an electronic device, a readable storage medium and a computer program product.

Figure 5:
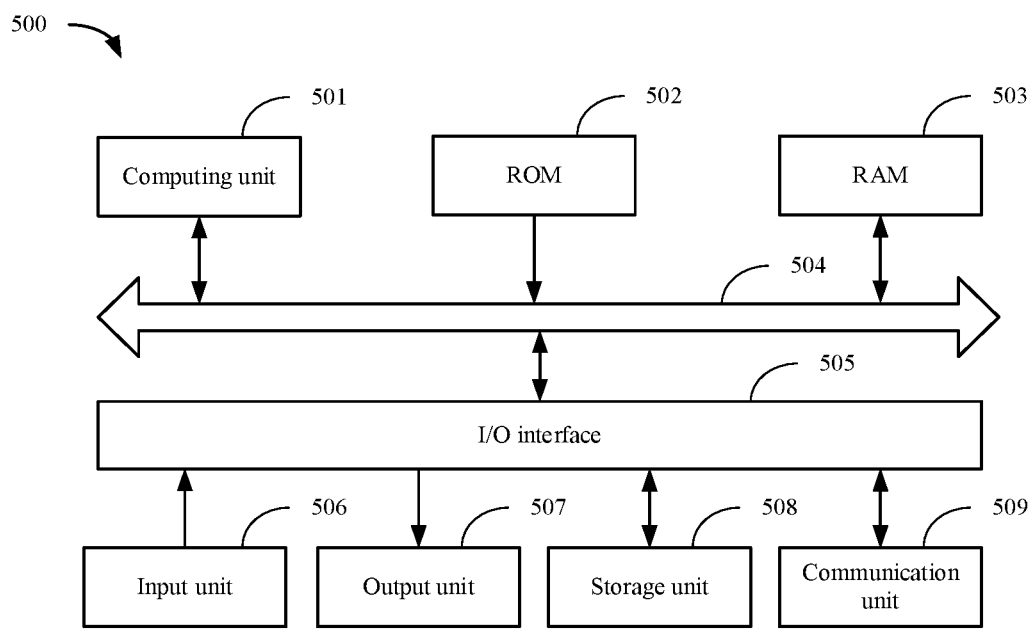
FIG. 5 is a block diagram of an electronic device configured to implement a method for video processing according to an embodiment of the present disclosure.

FIG. 5 is a schematic block diagram of an exemplary electronic device 500 configured to implement embodiments of the present disclosure. The electronic device is intended to represent various forms of digital computers, such as laptops, desktops, workbenches, PDAs, servers, blade servers, mainframe computers and other suitable computers. The electronic device may further represent various forms of mobile devices, such as PDAs, cellular phones, smart phones, wearable devices and other similar computing devices. The components, their connections and relationships, and their functions shown herein are examples only, and are not intended to limit the implementation of the present disclosure as described and/or required herein.

As shown in FIG. 5, the electronic device 500 includes a computing unit 501, which may perform various suitable actions and processing according to a computer program stored in a read-only memory (ROM) 502 or a computer program loaded from a storage unit 508 into a random access memory (RAM) 503. The RAM 503 may also store various programs and data required to operate the electronic device 500. The computing unit 501, the ROM 502 and the RAM 503 are connected to one another by a bus 504. An input/output (I/O) interface 505 may also be connected to the bus 504.

A plurality of components in the electronic device 500 are connected to the I/O interface 505, including an input unit 506, such as a keyboard and a mouse; an output unit 507, such as various displays and speakers; a storage unit 508, such as disks and discs; and a communication unit 509, such as a network card, a modem and a wireless communication transceiver. The communication unit 509 allows the electronic device 500 to exchange information/data with other devices over computer networks such as the Internet and/or various telecommunications networks.

The computing unit 501 may be a variety of general-purpose and/or special-purpose processing components with processing and computing capabilities. Some examples of the computing unit 501 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 501 performs the methods and processing described above, such as the method for video processing. For example, in some embodiments, the method for video processing may be implemented as a computer software program that is tangibly embodied in a machine-readable medium, such as the storage unit 508. In some embodiments, part or all of a computer program may be loaded and/or installed on the electronic device 500 via the ROM 502 and/or the communication unit 509. One or more steps of the method for video processing described above may be performed when the computer program is loaded into the RAM 503 and executed by the computing unit 501. Alternatively, in other embodiments, the computing unit 501 may be configured to perform the method for video processing by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the method in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, an RAM, an ROM, an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation schema of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, a distributed system server, or a server combined with blockchain.

It should be understood that the steps can be reordered, added, or deleted using the various forms of processes shown above. For example, the steps described in the present application may be executed in parallel or sequentially or in different sequences, provided that desired results of the technical solutions disclosed in the present disclosure are achieved, which is not limited herein.

The above specific implementations do not limit the protection scope of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the protection scope of the present disclosure.

What is claimed is:

1. A method for video processing, comprising:
acquiring ambient brightness data of a display device, the display device adopting a standard dynamic range (SDR) technology;
obtaining screen brightness data of the display device according to video brightness data of to-be-displayed high dynamic range (HDR) video, metadata of the HDR video, and the ambient brightness data, comprising: acquiring the metadata of the HDR video; obtaining the video brightness data by tone mapping on the metadata; and adjusting the video brightness data according to the ambient brightness data and the metadata by using a brightness adjustment function, so as to obtain the screen brightness data of the display device; and
controlling, by using the screen brightness data, the display device to display the HDR video,
wherein the obtaining the video brightness data by tone mapping on the metadata comprises:
obtaining brightness data after electro-optic conversion according to the metadata by using a preset electro-optic conversion function;
obtaining brightness data after tone mapping according to the brightness data after electro-optic conversion and the display data of the display device by using a preset tone mapping function;
performing color gamut conversion on the brightness data after tone mapping to obtain brightness data after color gamut conversion; and
obtaining the screen brightness data of the display device according to the brightness data after color gamut conversion by using a preset photoelectric conversion function.

2. The method of claim 1, wherein the obtaining screen brightness data of the display device according to video brightness data of to-be-displayed HDR video, metadata of the HDR video, and the ambient brightness data comprises:
obtaining maximum brightness in the metadata according to the metadata of the HDR video; and
obtaining the screen brightness data of the display device according to the video brightness data, the maximum brightness, and the ambient brightness data.

3. The method of claim 1, wherein the brightness adjustment function is obtained based on an evaluation fitting algorithm or an S-shaped curve function.

4. The method of claim 3, wherein the S-shaped curve function is a logistic function.

5. An electronic device, comprising:
- at least one processor; and
- a memory communicatively connected with the at least one processor;
- wherein the memory stores instructions executable by the at least one processor, and the instructions are executed by the at least one processor to enable the at least one processor to perform a method for video processing, wherein the method comprises:
- acquiring ambient brightness data of a display device, the display device adopting an SDR technology;
- obtaining screen brightness data of the display device according to video brightness data of to-be-displayed HDR video, metadata of the HDR video, and the ambient brightness data, comprising: acquiring the metadata of the HDR video; obtaining the video brightness data by tone mapping on the metadata; and adjusting the video brightness data according to the ambient brightness data and the metadata by using a brightness adjustment function, so as to obtain the screen brightness data of the display device; and
- controlling, by using the screen brightness data, the display device to display the HDR video,
- wherein the obtaining the video brightness data by tone mapping on the metadata comprises:
- obtaining brightness data after electro-optic conversion according to the metadata by using a preset electro-optic conversion function;
- obtaining brightness data after tone mapping according to the brightness data after electro-optic conversion and the display data of the display device by using a preset tone mapping function;
- performing color gamut conversion on the brightness data after tone mapping to obtain brightness data after color gamut conversion; and
- obtaining the screen brightness data of the display device according to the brightness data after color gamut conversion by using a preset photoelectric conversion function.

6. The electronic device s of claim 5, wherein the obtaining screen brightness data of the display device according to video brightness data of to-be-displayed HDR video, metadata of the HDR video, and the ambient brightness data comprises:
- obtaining maximum brightness in the metadata according to the metadata of the HDR video; and
- obtaining the screen brightness data of the display device according to the video brightness data, the maximum brightness, and the ambient brightness data.

7. The electronic device of claim 5, wherein the brightness adjustment function is obtained based on an evaluation fitting algorithm or an S-shaped curve function.

8. The electronic device of claim 7, wherein the S-shaped curve function is a logistic function.

9. A non-transitory computer readable storage medium with computer instructions stored thereon, wherein the computer instructions are used for causing a method for video processing, wherein the method comprises:
- acquiring ambient brightness data of a display device, the display device adopting a standard dynamic range (SDR) technology;
- obtaining screen brightness data of the display device according to video brightness data of to-be-displayed high dynamic range (HDR) video, metadata of the HDR video, and the ambient brightness data, comprising: acquiring the metadata of the HDR video; obtaining the video brightness data by tone mapping on the metadata; and adjusting the video brightness data according to the ambient brightness data and the metadata by using a brightness adjustment function, so as to obtain the screen brightness data of the display device; and
- controlling, by using the screen brightness data, the display device to display the HDR video,
- wherein the obtaining the video brightness data by tone mapping on the metadata comprises:
- obtaining brightness data after electro-optic conversion according to the metadata by using a preset electro-optic conversion function;
- obtaining brightness data after tone mapping according to the brightness data after electro-optic conversion and the display data of the display device by using a preset tone mapping function;
- performing color gamut conversion on the brightness data after tone mapping to obtain brightness data after color gamut conversion; and
- obtaining the screen brightness data of the display device according to the brightness data after color gamut conversion by using a preset photoelectric conversion function.

10. The non-transitory computer readable storage medium of claim 9, wherein the obtaining screen brightness data of the display device according to video brightness data of to-be-displayed HDR video, metadata of the HDR video, and the ambient brightness data comprises:
- obtaining maximum brightness in the metadata according to the metadata of the HDR video; and
- obtaining the screen brightness data of the display device according to the video brightness data, the maximum brightness, and the ambient brightness data.

11. The non-transitory computer readable storage medium of claim 9, wherein the brightness adjustment function is obtained based on an evaluation fitting algorithm or an S-shaped curve function.

* * * * *